United States Patent [19]
Ciarniello et al.

[11] 4,048,469
[45] Sept. 13, 1977

[54] AUTOMATIC CONTROL SYSTEM FOR A DEFOGGING CIRCUIT

[75] Inventors: Giorgio Ciarniello, Vasto; Oscar De Lena, Termoli, both of Italy

[73] Assignee: Societa Italiana Vetro Siv S.p.A., Vasto, Italy

[21] Appl. No.: 531,098

[22] Filed: Dec. 9, 1974

[30] Foreign Application Priority Data

Dec. 12, 1973 Italy .................................. 54277/73

[51] Int. Cl.² .......................... H05B 1/02; H05B 3/06; E06B 7/12
[52] U.S. Cl. ....................... 219/203; 52/171; 200/61.05; 219/490; 219/522; 219/547; 338/35; 340/235
[58] Field of Search .............. 219/203, 522, 547, 543, 219/490; 52/171; 338/35; 200/61.05–61.07; 340/234, 235; 318/483

[56] References Cited
U.S. PATENT DOCUMENTS

| | | | |
|---|---|---|---|
| 2,866,881 | 12/1958 | McMillen | 219/203 UX |
| 3,524,043 | 8/1970 | Irvine | 219/203 UX |
| 3,749,885 | 7/1973 | Nagasima | 219/203 X |
| 3,864,659 | 2/1975 | Furuuchi et al. | 219/203 UX |
| 3,868,492 | 2/1975 | Taylor | 219/203 |

*Primary Examiner*—A. Bartis
*Attorney, Agent, or Firm*—Browdy and Neimark

[57] ABSTRACT

The glass pane of a vehicle window is provided on the surface of its central viewing area with a plurality of spaced, parallel linear heating resistors. First and second buses, disposed laterally of the central viewing area, extend transversely of the resistors and supply electric power to the resistors. A miniature transistorized control circuit mounted at a corner of the pane away from the central viewing area controls the supply of power to the buses. A plurality of moisture sensing, electrically conductive probes are provided on the pane at widely spaced zones and are connected to the input terminal means of the control circuit. Each probe includes a first portion coextensive in length with a resistor and running parallel thereto. One of the probes has a second portion parallel to and closely spaced from one of the buses. The control circuit responds to detection of fogging of the pane by anyone of the probes.

6 Claims, 6 Drawing Figures

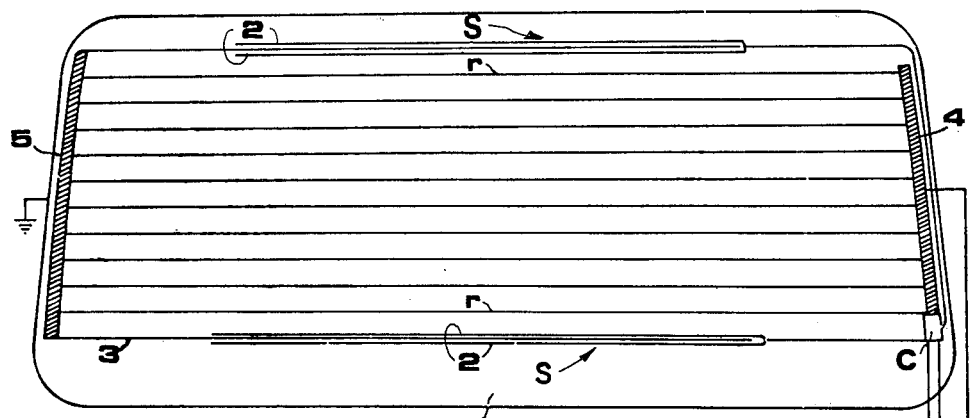
FIG.1
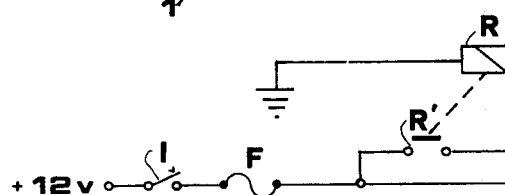
FIG.3
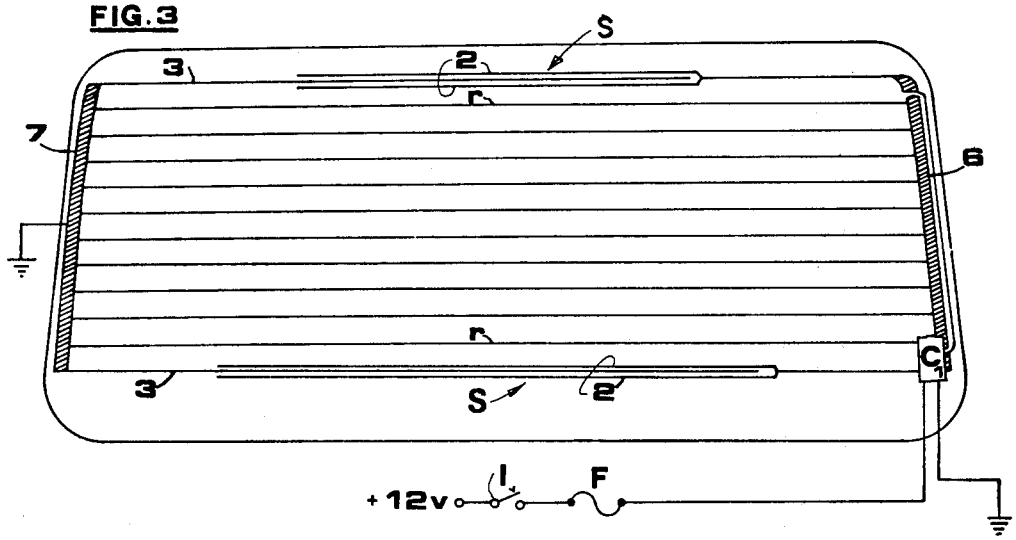

AUTOMATIC CONTROL SYSTEM FOR A DEFOGGING CIRCUIT

The invention refers to a device for automatically controlling the heating circuits of glass panes, i.e., to a device which automatically switches said heating circuit on when the glass panes become fogged and switches them off once their transparency has been restored. It is known that glass panes equipped with an electric heating system have many industrial and civil uses. In its use on vehicles (motorcars, airplanes, ships), the electric heating has the purpose of freeing the external surface of the glass pane from snow or ice and its internal surface from fogging caused by the condensation of water vapor upon it.

The present invention supplies a device for the automatic control of the electric heating system of glass panes, which automatically switches the circuit on when the fogging of the glass pane attains a predetermined degree, and switches it automatically off as soon as the fogging of said glass pane is reduced under a given limit.

Therefore, the device of the invention not only eliminates the need for a manual control of the heating system, but also greatly reduces the consumption of electric power.

The device of the invention, which is especially intended for the defogging of the rear windows of motor vehicles comprises probes of such a length and position as to control practically the whole area of said rear window and a control circuit which is piloted by said probes to connect and disconnect the heating circuit of said windows from the power supply.

According to another feature of the invention, said control circuits are miniaturized in such a manner as to be directly applicable to said rear window, thus avoiding, during the construction and fitting of the window, the complicated work of the electrical connections between said rear window and the electric system of the vehicle.

These control circuits may be either of the ON-OFF type, which comprises an electromechanical or electronic ON-OFF relay which switches the heating system of the glass pane on when a predetermined upper fogginess level is exceeded and switches it off as soon as a predetermined lower fogginess level is attained. Or else, it may comprise an electronic relay of the proportional type, which switches the heating system on when the glass pane is fogged beyond a given upper level and regulates the current supply to the heating system proportionally to the degree of fogginess of the glass pane, and switches the heating system off when the fogginess of the glass pane sinks under a predetermined lower level. The control circuit, being miniaturized, can always be applied to the glass pane. The electromechanical types of relays are applicable outside the glass pane, while the two types of electronic relays, owing to their extremely small size, are conveniently applied on the glass pane.

Some embodiments of the invention will now be described with reference to the attached drawings for a purely illustrative and in no way limitative purpose. In the drawings:

FIG. 1 shows a rear window for a motorcar, fitted with the heating circuit and the automatic control device comprising an electromagnetic relay;

FIG. 3 shows a motorcar rear window with a control device comprising an electronic relay;

Figure 2:
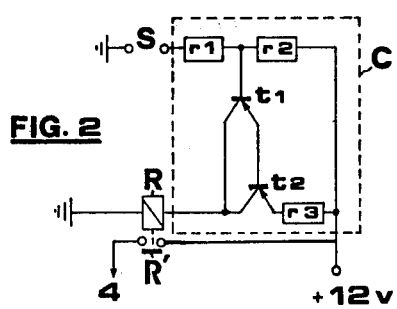
FIG. 2 shows the wiring diagram of a control circuit.

With reference to FIGS. 1 and 2, the heating circuit of the glass pane 1 of the rear window consists of an array of parallel-connected resistors $r$, connected on one end with the positive terminal of the power supply and at the other end with the ground. An upper and a lower probe S extends parallel to the resistors $r$ for a stretch approximately their length, so as to detect fogging on those areas where it occurs more readily. The probes of FIG. 1 and 2 comprise two parallelly running wires 2 connected to the positive terminal of the power supply, and a wire 3 extending between said wires 2 and connected with the ground. The contact between the wires 2 and 3 and therefore the passage of current through them is established by the formation of water droplets between them.

The geometric arrangement of the probes in the above described manner warrant an optimum and global response of the device to fog formation. In fact, if merely a small area of the glass pane is involved by the fog formation, even if it includes within its limits a small portion of the probe, it will not cause within said probe a passage of current such as to exceed the threshold value necessary for actuating the heating system, since only a very small amount of current passes between the wires 2 and 3. On the other hand, if the area where the fog forms involves a greater portion of any of the two probes, the current will attain a strength, which exceeds the threshold level of the control device, which will therefore be actuated.

The length of the probes S and their arrangement on the glass pane permits them not only to sense, notwithstanding their extreme thinness, those areas of the rear window which are most exposed to fog formation, but also permits to accurately adjust the response level of the control circuit. This result could not be obtained with the known probes, which are of a small bidimensional, generally square shape. Thus, they not only control a very small area of the rear window, but, being completely wetted by any degree and extension of the fog formed on the glass pane, they are unable to differentiate the current sufficiently to permit a regulation of the response level of the relays of the control circuit.

A further advantage of the device of the invention is that the conductors of the probes may be produced by the same process, such as the silk screen process, used for applying the resistors $r$ of the heating system, and also permits those probes to be connected with the same method used for said heating elements $r$, for instance through a single conductor, which may be similarly applied to the glass pane by the silk screen process.

FIG. 2 shows the wiring diagram of the control circuit proper C. It consists of a Darlington circuit comprising two transistors $t_1$ and $t_2$, the base of transistor 2 being connected with the emitter of the transistor $t_1$ while the base of transistor $t_1$ is connected with the positive terminal of the power supply by a resistor $r_2$ and the emitter of the transistor $t_2$ is connected with the positive terminal by a resistor $r_2$ and the emitter of transistor $t_2$ is connected with said positive terminal through a resistor $r_3$. The collectors of the transistors $t_1$ and $t_2$ are interconnected and their junctions is connected to one terminal of an electromagnetic relay R, whose other terminal is grounded. One end of the probes S is grounded, while their other end is connected with the base of the transistor $t_1$ through a resistor $r_1$. A master switch I and a fuse F are inserted between the positive terminal of the power supply and the control circuit.

When a current exceeding a given predetermined response threshold passes through the electrodes 2 and 3 of one or both the probes S, the coil of the electromagnetic relay R will be energized so that its contact $R_1$ will connect the positive terminal of the power source with one of the collectors 4 of the resistors r of the heating system, the other collector 5 of said heating system being permanently connected to the ground. As soon as the current through the electrodes 2 and 3 of the probes S sinks below said response threshold, the contact $R_1$ will disconnect the heating system from the positive terminal of the power source.

As stated, the Darlington circuit C may be miniaturized and applied directly to one corner of the glass pane, as indicated in the FIG. 1, while the electromechanical relay R may be positioned outside the glass pane.

Figure 4:
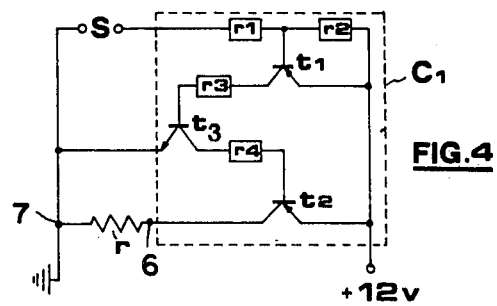
FIG. 4 shows the wiring diagram of the control circuit of the latter embodiment.

FIGS. 3 and 4 show a simplified embodiment of the device according to the invention. This embodiment permits to replace the electromechanical relay with an electronic relay, the whole being directly applicable to the glass pane of the rear window, as indicated at C' in FIG. 3.

The control circuit shown in FIG. 4 comprises three transistors $t_1$, $t_2$ and $t_3$. The first and the second transistors $t_1$ and $t_2$ have their emitter connected to the positive terminal of said power source, said first transistor $t_1$ having its base connected to said positive terminal through a first resistor $r_2$ and to one end of said probe S through a second resistor $r_1$, while its collector is connected through a third resistor $r_3$ to the base of a third transistor $t_3$, said third transistor $t_3$ having its collector connected to the base of said second transistor $t_2$ through a fourth resistor $r_4$ and its emitter connected to ground, said second transistor $t_2$ having its collector connected with one collector 6 of the defogging circuit, the other collector 7 of said defogging circuit being connected to ground. When a given threshold value of the current passing through the electrodes 2 and 3 has been attained or exceeded, the current heating the resistors r will be proportional to the magnitude of the current passing through the electrodes of the probes S. In this embodiment, only one wire is required to connect this system with the positive terminal and one conductor to connect it with the ground.

In this embodiment, the current requirements are proportional to the degree of fogginess of the window pane, which permits a considerable saving of electric power.

Both embodiments are easy to install. The embodiment shown in FIG. 1 and 2 has the advantage that in case of a failure of the circuit C, the latter may be excluded by blocking the contact R' in the "make" position and controlling the heating circuit manually through the switch 1. The embodiment of FIGS. 3 and 4 has the advantage of eliminating the electromagnetic switch with all its disadvantages, such as chatter, bounce and sparking, permits space saving and the elimination of the conductors between the relay and the control circuit $C_1$.

Furthermore, the automatic defogging device may be installed in existing motor vehicles without any substantial change in their circuitry, and the sensitivity of the device to fog formation may be preliminarily determined during the drafting stage.

Figure 5:
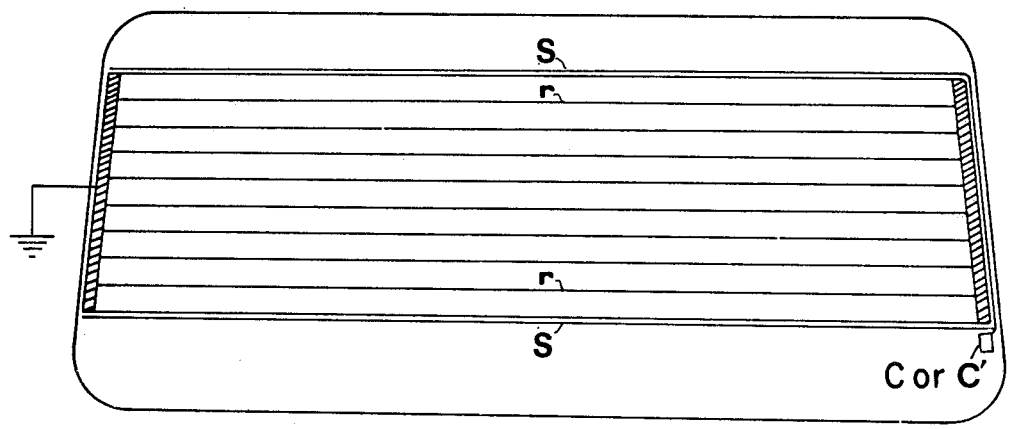
FIG. 5 shows a motorcar rear window with a different type of probe.

FIG. 5 shows a different embodiment of the probes. Each probe consists of a single conductor, which runs parallel and adjacently to one of the resistors R of the heating system. One end of this conductor is connected with the control circuit C or C', while said other adjacent resistor forms the other electrode.

Figure 6:
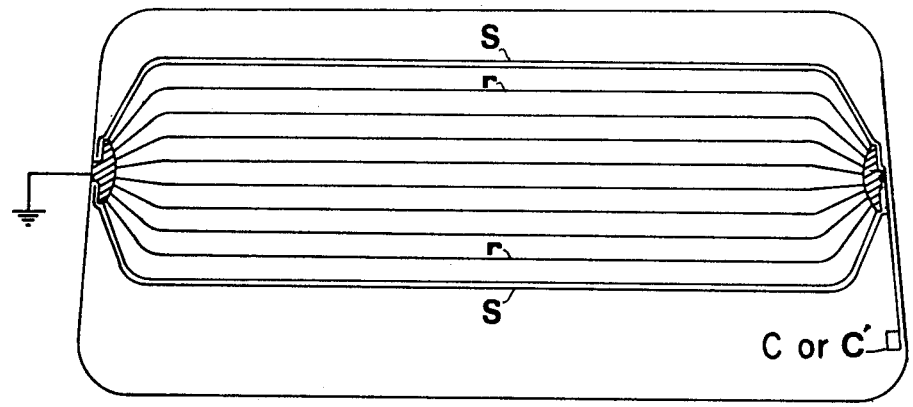
FIG. 6 shows a different arrangement of the heating elements of a rear window with its relating probes.

FIG. 6 shows the application of the device according to the invention to a different arrangement of the heating resistors. Also in this embodiment, the probes are formed of a single conductor running parallel and adjacently to the outermost resistors. The embodiments of FIGS. 5 and 6 use the $C_1$ or C type control circuit.

Both the probes and the heating elements may be applied upon the glass panel in a single silk screen process, this type of process being per se known. The device of the invention may also be applied to heating circuits, wherein the heating elements consist of a continuous layer of conducting material.

It is obvious that the present invention is not limited to the shape, number, size, and arrangement of the probes and to the particular control circuit shown in the here illustrated embodiments, and it is further understood that the invention is not restricted to its application to the glass panes, particularly rear windows, of motor cars. Furthermore the invention may be applicable to any surface which is subject to fogging or ice formation.

What is claimed is:

1. In an automatic control system for a defogging circuit for a glass pane having a central viewing area and which includes a plurality of spaced generally parallel elongated linear heating resistors disposed on a surface of the central viewing area of the pane, the improvement comprising:

an electric power supply including a first bus and a second bus disposed on said surface of the pane laterally of said central viewing area and connected to said resistors for supplying current to said heating resistors, said buses extending generally transversely of said resistors;

a control circuit controllably connected between said power supply and said first and second buses for controlling the supply of current thereto, said control circuit comprising a miniaturized unit mounted in the immediate vicinity of a corner of the pane away from the viewing area and having a control input terminal means; and a plurality of electrically conductive, moisture-sensing probes spaced apart from each other and said central viewing area at widely spaced zones on the glass pane, at least one of said probes including a conductive member having a portion running substantially parallel to and closely spaced from one of said buses, each of said probes having a portion running substantially parallel to said heating resistors of the defogging circuit, said probes each having a length, exclusive of said portion parallel to said bus, approximately the length of said heating resistors, each of said probes being sensitive to fogging of the glass pane in its immediate vicinity and having a signal output means upon which a signal appears upon occurrence of a given level of fogging, said control input terminal means of said control circuit being connected to each of said probes for receiving signals therefrom for enabling said control circuit to supply current to said heating resistors from said power supply in response to detection of fogging of said pane by any one of said probes.

2. An improved system according to claim 1, wherein said power supply has a first terminal and a second terminal and each of said probes comprises two spaced apart, parallel conductors each having one end connected to said first terminal of said power supply via said control circuit and a third conductor extending in parallel with and between said two conductors, said third conductor having one end connected to said second terminal of said power supply and being spaced from said two conductors.

3. An improved system according to claim 1, wherein each of said probes comprises a conductor having one end connected to said control input terminal means of said control circuit and extends parallel and adjacently to a respective one of said heating resistors and is spaced therefrom.

4. An improved system according to claim 1, wherein said power supply has a positive terminal, and wherein said control circuit comprises a first transistor whose base is connected by said input terminal means to each of said probes through a first resistor and to said positive terminal to said electric power supply through a second resistor, and whose collector is connected to a first terminal of an electromechanical relay controlling the supply of current to said first and second buses, another terminal of said relay being connected to a point of reference potential with respect to said positive terminal; and further comprising a second transistor whose base is connected with the emitter of said first transistor, whose emitter is connected to said positive terminal of said power supply through a third resistor and whose collector is connected with the collector of said first transistor and with said first terminal of said electromechanical relay.

5. An improved system according to claim 1, wherein said power supply has a positive terminal, and wherein said control circuit comprises a first and a second transistor having their respective emitters connected to said positive terminal of said power supply, said first transistor having its base connected to said positive terminal through a first resistor and to each of said probes by said input terminal means through a second resistor, while its collector is connected through a third resistor to the base of a third transistor, said third transistor having its collector connected to the base of said second transistor through a fourth resistor and its emitter connected to a point of reference potential with respect to said positive terminal, said second transistor having its collector connected to said first bus of the defogging circuit, said second bus of the defogging circuit being connected to said point of reference potential.

6. An improved system according to claim 1, wherein one of said probes extends along said glass pane in vicinity of its upper portion and another of said probes extends along said glass pane in vicinity of its lower portion.

* * * * *